United States Patent [19]

Cargould et al.

[11] Patent Number: 4,785,864

[45] Date of Patent: Nov. 22, 1988

[54] RIM MOUNT FOR TIRE UNIFORMITY MACHINE

[75] Inventors: Barry D. Cargould, Akron; James C. Beebe, Kent, both of Ohio

[73] Assignee: Eagle-Picher Industries, Inc., Cincinnati, Ohio

[21] Appl. No.: 160,695

[22] Filed: Feb. 26, 1988

[51] Int. Cl.$^4$ .............................................. B60C 25/00
[52] U.S. Cl. ........................................ 157/20; 73/146
[58] Field of Search ................ 157/14, 20, 21; 73/146

[56] References Cited

U.S. PATENT DOCUMENTS

| | | | |
|---|---|---|---|
| 3,080,899 | 3/1963 | Robertson | 157/20 X |
| 4,023,407 | 5/1977 | Vanderzee | 73/146 |
| 4,538,660 | 9/1985 | Franco | 157/20 |
| 4,574,628 | 3/1986 | Maikuma et al. | 73/146 |
| 4,704,900 | 11/1987 | Beebe . | |

Primary Examiner—James G. Smith
Attorney, Agent, or Firm—Wood, Herron & Evans

[57] ABSTRACT

A rim mount for a tire uniformity machine. The upper rim has bolts that cooperate with keyhole slots in an adaptor to mount the upper rim. The lower rim has keyhole slots that cooperate with bolts threaded into a lower chuck to mount the lower rim.

4 Claims, 2 Drawing Sheets

RIM MOUNT FOR TIRE UNIFORMITY MACHINE

This invention relates to a rim mount for a tire uniformity machine.

In a tire uniformity machine, tires are mounted between upper and lower rim halves. A road wheel engages the tire. Force measuring apparatus associated with the tire is employed to determine the uniformity of the tire.

The upper rim does not move vertically. The lower rim is mounted on a vertically-movable chuck. A conveyor carries tires into the uniformity machine, that is, into the space between the upper and lower rims. The lower rim, which is below the level of the conveyor as the tire is conveyed in, is raised to capture the tire and to carry it up to the upper rim. The rims close upon the tire, the tire is inflated, and the road wheel is moved into position to perform the uniformity test.

Every tire that is manufactured must be tested, for otherwise drivers of vehicles on which substandard tires are mounted would be distressed at the performance of their vehicles. When the manufactured tire size is changed, the rim size must be changed. In the normal course of manufacturing tires, the rims might very well be changed several times in an eight-hour shift. The frequency of change is, if anything, increasing in view of the present tendency toward producing only the number of tires that are needed, thereby eliminating the warehousing of tires associated with long runs.

Changing the rims is laborious and time-consuming. Each rim half weighs about fifty pounds. Each half is secured to its respective support by four bolts. The bolts must be loosened and removed. A new rim is put in place and the rim holes are aligned with the support holes. The bolts are returned, threaded into the rim or support and tightened. Consider the upper rim. The bolts must pass downwardly through the adaptor and be threaded into threaded holes in the upper rim. It is necessary to hold the fifty-pound upper rim in place and to align it with the bolt holes. But there is no room above the adaptor to see the alignment of the bolt holes and the insertion of the bolts. Loose bolts are dropped. When a loose bolt is dropped, the mechanic must climb down from the machine and find the bolt. The bolts must be turned fully to tighten them. In removing a rim, when the bolts are removed from one side, it tends to drop making difficult the removal of the bolts from the other side.

An objective of the present invention has been to provide a rim mount that is quicker and less laborious to install than prior rim mounts.

Another objective of the invention has been to provide a very inexpensive improved rim mount.

In the rim mount of the present invention, the bolts remain threaded into their respective rim or support. The respective support or rim which is to be connected by the bolts has bolt holes in the form of keyhole slots. The keyhole slots have a large portion sufficient to pass the bolt heads and a small portion through which the shank of the bolt can pass but through which the bolt head cannot pass. With the keyhole configuration, the rim is put into position with bolts passing through the keyholes. The rim is rotated a degree or so to move the shank into the small portion of the keyhole. The bolts are thereafter tightened.

An additional feature of the invention is the provision of a recess or counterbore surrounding the small portion of the keyhole, the recess being sufficient to receive the bolt head axially, but too small to permit the escape of the bolt head circumferentially. When the bolt is tightened with the head moving into the recess, it is impossible for the rim to rotae with respect to its support and then inadvertently become disconnected from its support.

In the preferred form of the invention, the bolts are threaded into the lower chuck and the lower rim is provided with the keyholes as described.

The bolts are threaded into the upper rim and the adaptor into which the upper rim is mounted has the keyholes.

The improvement described above has several advantages:

1. The mechanic does not lose bolts.
2. The mechanic does not have to run the bolts the full length required to tighten them. A half turn or so will do it.
3. In removing the upper rim, the rim comes off evenly, that is, the situation of removing a bolt from one side causing that side of the rim to drop is avoided.
4. The alignment of the bolts with the keyholes is more easily done because the mechanic can, from a position below the adaptor, see where the bolt holes are as he moves the rim carrying the bolts up into position.
5. The lower rim is similarly more easily aligned. The mechanic can see through the keyholes to be sure that the keyholes are aligned with the bolts as the rim is lowered onto the lower chuck. The height of the bolt creates light from below the rim for alignment.

The several features and objectives of the invention will become more readily apparent from the following detailed description taken in conjunction with the accompanying drawings in which.

Figure 1:
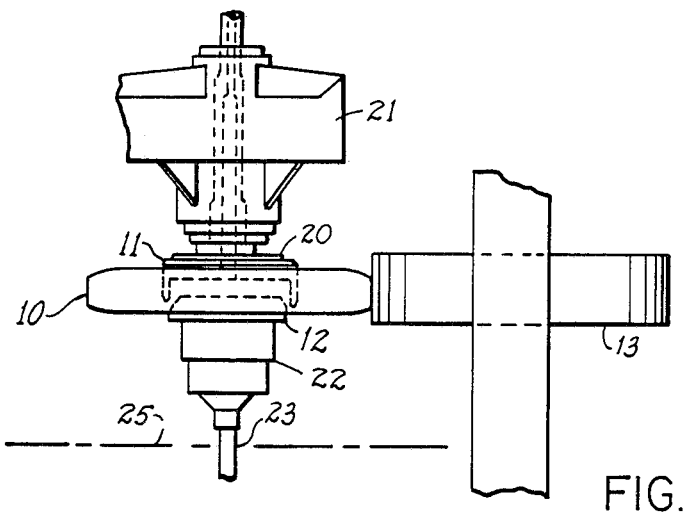
FIG. 1 is a diagrammatic, elavational view of the tire uniformity machine with which the present invention is employed.

Referring to FIG. 1, the uniformity machine may be of the type disclosed more completely in U.S. Pat. No. 4,704,900, the disclosure for which is specifically incorporated herein by reference. A tire 10 is captured between an upper rim 11 and a lower rim 12. The tire is rotatable and is engaged by a road wheel 13 and driven at a preselected speed to determine the uniformity of the tire.

The upper rim 11 is mounted on an adaptor 20 which is rotatably mounted in the upper portion of a base 21. The lower rim 12 is bolted to a chuck 22. The chuck 22 is mounted on a vertically-movable shaft 23, the shaft also being rotatably mounted in the lower portion of the base 21.

In the operation of the tire uniformity machine, the chuck 22 is lowered below a conveyor 25. The tire 10 is conveyed by the conveyor into a position immediately above the chuck 22 and lower rim 12. The lower rim 12 is raised by the chuck 22 into engagement with the lower bead of the tire 10. The lower rim then carries the tire up to the upper rim. The tire is then inflated and engaged by and rotated by the road wheel 13 to carry out the testing procedure.

Figure 2:
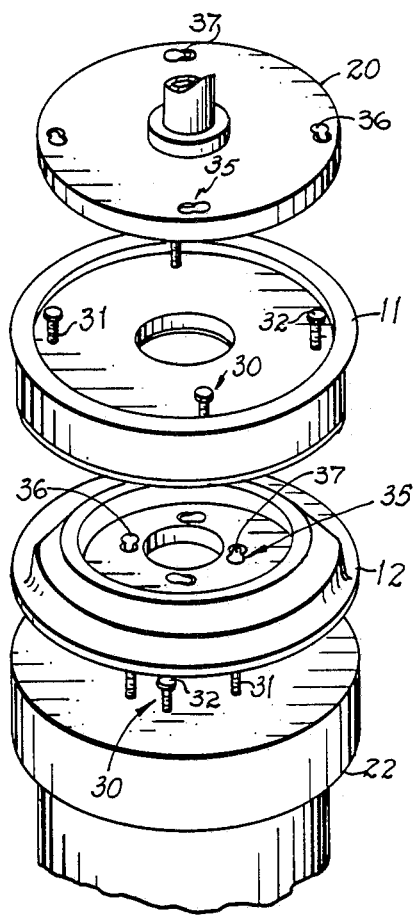
FIG. 2 is a disassembled, perspective view of the rims and the supports to which they are mounted.
Figure 3:
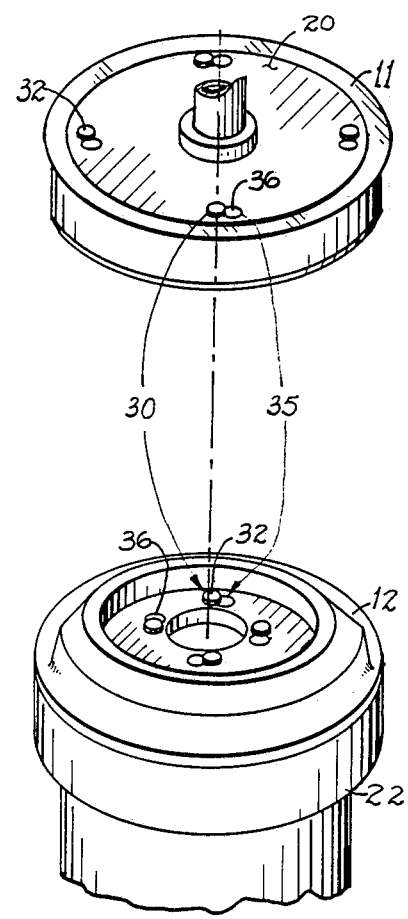
FIG. 3 is a perspective view of the rims assembled to their respective supports.
Figure 4:
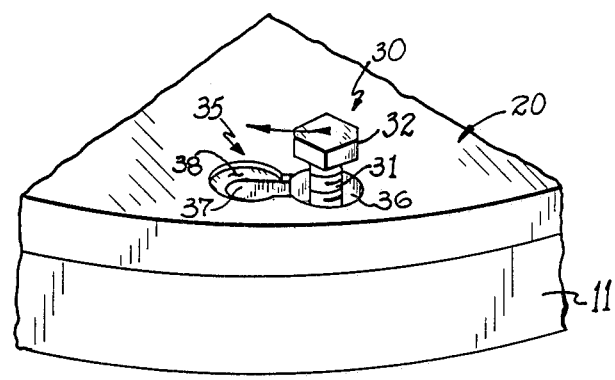
FIG. 4 is a diagrammatic fragmentary enlarged perspective view showing the bolt and bolt hole configuration applicable to either the upper or lower rim.
Figure 5:
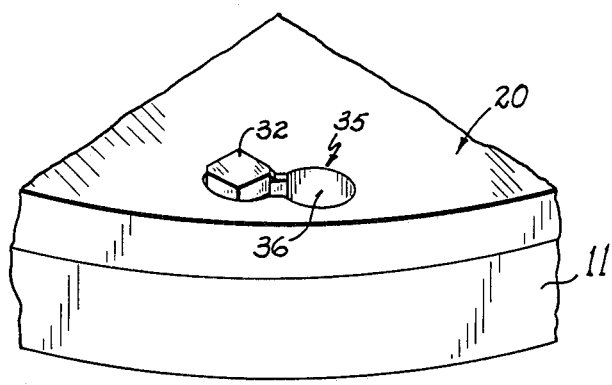
FIG. 5 is a view similar to FIG. 4 showing the bolt tightened.

As shown in FIGS. 2 and 4, the upper rim 11 has four equiangularly-spaced bolts 30 threaded into threaded bores. Each bolt 30 has a shank 31 and a head 32.

The adaptor 20 has four equiangularly-spaced bolt holes 35, each bolt hole being in the shape of a keyhole. Referring to FIG. 4, each bolt hole has a large diameter portion 36 which is large enough to permit the bolt head 32 to pass. The bolt hole has a small diameter portion 37 which is large enough to receive the bolt shank 31, but insufficiently large to permit the bolt head 32 to pass. A recess or counterbore 38 surrounds the small hole 37. The recess is just large enough to receive the bolt head 32, but is too small for the bolt head to escape by moving in a circumferential direction with respect to the recess. The depth of the recess should be such as to securely receive the bolt head but leave a portion of the bolt head accessible for the wrench that tightens and loosens it.

The lower chuck and rim have bolts and bolt holes similar to those of the upper rim and adaptor except that, in the illustrated form of the invention, the direction of the bolt holes is reversed. Since the tires are driven in both directions, the direction of the bolt holes is unimportant.

The lower chuck 22 carries four equiangularly spaced bolts 30 having shanks 31 and bolt heads 32. The lower rim 12 has four keyhole-shaped bolt holes 35 that are aligned with the respective bolts 30. Preferably, the bolts and bolt holes of the lower rim 12 and chuck 22 are identical to the bolts and bolt holes of the upper adaptor 20 and rim 11.

In the operation of the invention, the rims are loosened from their respective supports by rotating the bolts a half turn or so to permit the heads to raise above the confining recesses 38. When the bolts are loosened to this extent, the rims are rotated in a direction to bring the bolt heads in alignment with the larger holes 36. The rims are then easily removed from their respective adaptor or chuck.

A different upper rim is brought into position. It has its four bolts in place. The workman below can see to align the bolts with the bolt holes and then raises the rim snugly against the adaptor with the bolts passing through the large openings 36. The rim is then turned slightly to bring each bolt shank into the smaller hole in the keyhole. A wrench is applied to run the bolt heads down into the recess or counterbore 38 to secure the rim tightly to the adaptor. When tightly secured, the rim cannot be removed from the adaptor without loosening the bolts sufficiently to raise the bolt heads above the recesses 38.

The lower rim 12 is mounted on the chuck 22 by aligning the bolt holes 35 with the bolts 30. This is relatively easily done since the bolt heads can be viewed through the bolt holes. There will always be light from beow the rim until the bolts are aligned with the bolt holes since the bolts, projecting above the chuck 22, will space the rim 12 from the chuck until the alignment is complete. After alignment, the rim is snugly placed against the chuck and rotated to bring the shanks 31 into the small openings 37. Thereafter, the bolts are tightened until the heads are seated in the recesses 38.

In the operation of the uniformity machine, the tire is rotated in both directions. The disposition of the bolt heads in the counterbores prevents dislodgement of the rims from their supports.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. The rim mount for a tire uniformity machine comprising,
    upper and lower rim supports,
    upper and lower rims mounted on said rim supports,
    a plurality of bolts securing said rims to said rim supports, each said bolt having a head and a threaded shank,
    one of said rims and rim supports having said plurality of bolts partially threaded in it,
    the other of said rims and rim supports having a plurality of keyhole slots for receiving said bolts,
    each said keyhole slot having a large portion of a size sufficient to pass said bolt head, and a small portion of a size sufficient to receive said bolt shank but insufficient to pass said bolt head.

2. The rim mount as in claim 1 further comprising,
    means forming a recess in each said support surrounding at least one small portion of said keyhole slot, each recess being large enough to receive a bolt head whereby when a bolt is tightened into said recess, said rim is unable to rotate with respect to said support.

3. The rim mount for a tire uniformity machine comprising,
    a lower chuck,
    a lower rim positionable on said chuck,
    an upper adaptor,
    an upper rim positionable on said adaptor,
    a plurality of bolts threaded into said chuck and upper rim and projecting upwardly therefrom,
    each said bolt having a head integral with a shank,
    each said lower rim and upper adaptor having keyhole slots aligned with and adapted to receive the bolts in said chuck and upper rim, respectively,
    each said keyhole slot having a large portion of a size sufficient to pass said bolt head and a small portion of a size sufficient to receive said bolt shank but insufficient to pass said bolt head.

4. The rim munt as in claim 1 further comprising,
    means forming a recess in each said lower rim and adaptor, respectively, surrounding each said small portion of said keyhole slot, each recess being large enough to receive a bolt head whereby when a bolt is tightened into said recess, a rim is unable to rotate with respect to its chuck or adaptor.

* * * * *